US010974422B2

(12) United States Patent
Hubert et al.

(10) Patent No.: US 10,974,422 B2
(45) Date of Patent: Apr. 13, 2021

(54) MOULDING ASSEMBLY AND METHOD FOR PRODUCING A SYRINGE BODY

(71) Applicant: APTAR FRANCE SAS, Le Neubourg (FR)

(72) Inventors: Thierry Hubert, Saint Remy du Val (FR); Vincent Hebert, Ymare (FR); Olivier His, Saint Etienne du Vauvray (FR)

(73) Assignee: APTAR FRANCE SAS, Le Neubourg (FR)

( * ) Notice: Subject to any disclaimer, the term of this patent is extended or adjusted under 35 U.S.C. 154(b) by 0 days.

(21) Appl. No.: 16/660,957

(22) Filed: Oct. 23, 2019

(65) Prior Publication Data
US 2020/0055217 A1 Feb. 20, 2020

Related U.S. Application Data

(62) Division of application No. 15/546,491, filed as application No. PCT/FR2016/050251 on Feb. 5, 2016, now Pat. No. 10,800,077.

(30) Foreign Application Priority Data

Feb. 6, 2015 (FR) ...................................... 1550953

(51) Int. Cl.
*B29C 45/14* (2006.01)
*B29C 45/04* (2006.01)
(Continued)

(52) U.S. Cl.
CPC ........ *B29C 45/14065* (2013.01); *B29C 45/04* (2013.01); *B29C 45/14008* (2013.01);
(Continued)

(58) Field of Classification Search
CPC .............. B29C 45/14065; B29C 45/04; B29C 45/14008; B29C 45/14336
See application file for complete search history.

(56) References Cited

U.S. PATENT DOCUMENTS 9,345,846 B1 * 5/2016 Rabinne ............ B29C 45/14008
2010/0270702 A1 10/2010 Zelkovich et al.
2014/0070453 A1 3/2014 Dietl

FOREIGN PATENT DOCUMENTS

DE 4140099 C1 5/1993
EP 2229197 B1 * 11/2012 ............ A61M 5/343
WO WO-2012150897 A1 * 11/2012 ....... B29C 45/14065

OTHER PUBLICATIONS

International Preliminary Report on Patentability with a Translation of Written Opinion issued from the International Bureau in counterpart International Application No. PCT/FR2016/050251, dated Aug. 17, 2017.

(Continued)

*Primary Examiner* — Joseph S Del Sole
*Assistant Examiner* — Yung-Sheng M Tsui
(74) *Attorney, Agent, or Firm* — Sughrue Mion, PLLC

(57) ABSTRACT

A molding assembly for manufacturing a syringe barrel, each syringe barrel provided with a cannula and having a cylindrical portion and a hub portion to which the cannula is fastened. A mold unit is provided having a first mold portion, a second mold portion axially movable relative to the first mold portion between an open position and a closed position, and a core situated in the mold cavity; and a clip unit for the cannula movable between an open position in which a cannula can be loaded in a proximal axial end of the clip, and a closed position. The clip unit is axially movable so as to arrange a cannula in the mold cavity, the movement of the (Continued)

clip being independent of the axial movement of the first and second mold portions between the open and closed positions of the mold unit.

11 Claims, 10 Drawing Sheets

(51) Int. Cl.
    *B29L 31/00*         (2006.01)
    *B29K 705/00*       (2006.01)

(52) U.S. Cl.
    CPC .. *B29C 45/14336* (2013.01); *B29C 45/14598* (2013.01); *B29K 2705/00* (2013.01); *B29L 2031/7544* (2013.01)

(56) References Cited

OTHER PUBLICATIONS

International Search Report for PCT/FR2016/050251 dated May 2, 2016 [PCT/ISA/210].

\* cited by examiner

MOULDING ASSEMBLY AND METHOD FOR PRODUCING A SYRINGE BODY

CROSS REFERENCE TO RELATED APPLICATIONS

This application is a Divisional of U.S. patent application Ser. No. 15/546,491, filed Jul. 26, 2017, which is a National Stage of International Application No. PCT/FR2016/050251, filed on Feb. 5, 2016, which claims priority from French Patent Application No. 1550953, filed on Feb. 6, 2015, the contents of all of which are incorporated herein by reference in their entirety.

The present invention relates to a molding assembly and to a method of manufacturing a syringe barrel.

Syringes are well known in the prior art. Such devices comprise a barrel of generally cylindrical shape that at one end receives a needle-forming cannula for perforating the injection site and for dispensing a fluid into said injection site, and at the other end is provided with a piston bulb that, at rest, holds the fluid to be dispensed in said barrel, and that, in use, slides in leaktight manner in said barrel so as to dispense said fluid through said cannula.

Assembling a cannula on a syringe barrel is a crucial step in manufacturing syringes. The cannula must be positioned with accuracy, and then fastened to the syringe without being damaged. The cannula must be in alignment with the central axis of the syringe. The cannula must also be fastened to the syringe in a manner that is strong enough to comply with regulatory requirements. The cannula may be inserted as a tight fit in the preformed syringe barrel. This technique is difficult to control, in particular with cannulas of small diameter. The cannula may also be fastened to the syringe barrel by an adhesive. However, generally it is not desirable to use such an adhesive for fastening a cannula of a syringe, since the adhesive may contain toxic chemicals that could infiltrate into the contents of the syringe, and this could disturb the effectiveness and/or the stability of the contents of the syringe.

In some circumstances, in particular when the barrel is made out of synthetic material and not out of glass, the cannula may be assembled on said barrel by overmolding, i.e. by injection-molding the syringe barrel onto said cannula, thereby making it possible in particular to avoid the use of an adhesive, and making it possible to guarantee a strong fastening. Documents EP 2 229 197 and WO 2012/150897 describe molding assemblies and manufacturing methods of that type, including a clip for the cannula and a mold for injecting the syringe barrel onto said cannula.

However, the molding assemblies used to perform that type of overmolding method present drawbacks. Thus, in document EP 2 229 197, opening and closing of the clip are correlated with opening and closing of the mold. The clip thus makes it possible to hold the cannula in the mold during injection, but it does not enable the cannula to be moved towards the mold, since the clip is open outside the mold and the cannula is thus not held. That system is thus a holding system only. Other means must thus be used to position the cannula in the housing of the mold, such as a robot, which makes assembly more complex. In document WO 2012/150897, the clip system consists of two sub-portions, each sub-portion being secured to a half mold. That description corresponds to a mold made up of two half-shells. In that configuration, the clip system is thus likewise only a holding system for holding the cannula during injection, and other means need to be used for positioning the cannula in the housing of the mold. In addition, with half-shell molding, there is a risk of molding faults appearing (infiltration, deformation) at the junction between the two shells, and in particular at the hub of the syringe which receives the cannula and on which a needle guard must provide sealing. There is thus a risk of loss of sealing.

An object of the present invention is to provide a molding assembly and a method of manufacturing a syringe barrel that does not have the above-mentioned drawbacks.

In particular, an object of the present invention is to provide a molding assembly and a method of manufacturing a syringe barrel that make it possible to reduce the steps of transferring the cannula, thereby in particular reducing the risks of damaging the cannula.

The present invention also provides a molding assembly and a method of manufacturing a syringe barrel that make it possible to limit exposing the cannula to external contaminants.

The present invention also provides a molding assembly and a method of manufacturing a syringe barrel that make it possible to improve accuracy in positioning the cannula in the mold during molding.

An object of the present invention is also to provide a molding assembly and a method of manufacturing a syringe barrel that are simple and inexpensive to manufacture and to implement.

The present invention thus provides a molding assembly for manufacturing at least one syringe barrel, each syringe barrel being provided with a cannula, each syringe barrel comprising a cylindrical portion and a hub portion to which said cannula is fastened, the molding assembly comprising:

at least one mold unit, each mold unit comprising a first mold portion, a second mold portion that is axially movable relative to said first mold portion between an open position and a closed position in which said first and second mold portions co-operate with each other to define a mold cavity between them, and a core that is situated in said mold cavity so as to define the shape of said syringe barrel; and at least one clip unit for clipping the cannula, each clip unit comprising a clip that is movable between an open position in which a cannula can be loaded in a proximal axial end of said clip, and a closed position in which said cannula is held in said clip, said clip unit being axially movable relative to said mold unit so as to arrange a cannula in said mold cavity, the movement of said clip between its open and closed positions being independent of the axial movement of said first and second mold portions between the open and closed positions of said mold unit.

Advantageously, each clip unit includes an actuator element that is axially movable between a closed position and an open position, said actuator element being adapted to move said clip between said closed and open positions.

Advantageously, said actuator element includes a frusto-conical proximal axial end that co-operates with a distal axial end of said clip, said distal axial end of said clip having a hollow conical shape that is complementary to said frustoconical proximal axial end of said actuator element, such that axial movement of said actuator element causes radial movement of said clip between said closed and open positions.

Advantageously, the molding assembly includes at least one control member, such as a jack, that co-operates with said actuator element of said at least one clip unit, so as to move said actuator element between its closed and open positions.

Advantageously, each clip is urged resiliently towards its closed position.

Advantageously, the molding assembly further includes at least one cannula-loading unit that is adapted to load a respective cannula into a respective clip unit.

Advantageously, said at least one clip unit is mounted on a pendular arm that is adapted to move said at least one clip unit transversally, in particular by pivoting, between a cannula-loading first position in which said at least one cannula-loading unit loads a respective cannula in said at least one clip unit, and a molding second position in which said at least one clip unit is adapted to arrange said cannula in a respective mold unit.

Advantageously, said molding assembly includes two mold units, two cannula-loading units, and four clip units, said four clip units being mounted in pairs on said pendular arm, such that there is always one clip unit facing each cannula-loading unit and each mold unit.

Advantageously, said molding assembly further includes control members, each of which co-operates with a first clip unit in said cannula-loading first position of said pendular arm, and with a second clip unit in said molding second position of said pendular arm.

Advantageously, said at least one cannula-loading unit is fastened on said second mold portion.

Advantageously, each clip includes a recess that receives the perforating tip of the cannula in all positions, such that no stress is exerted on said perforating tip while loading said cannula into said clip by said cannula-loading unit, while moving said clip, and while molding said syringe barrel around said cannula by said mold unit.

Advantageously, each mold unit includes a positioner member that co-operates with the axial end of the cannula that is remote from said perforating tip, so as to ensure that said cannula is positioned accurately in said mold unit while molding the syringe barrel.

The present invention also provides a method of manufacturing a syringe barrel provided with a cannula, said syringe barrel comprising a cylindrical portion and a hub portion on which said cannula is fastened, the manufacturing method comprising the following steps:
  providing a clip unit including a clip that is movable between a closed position and an open position;
  opening said clip by means of an actuator element of said clip unit, said actuator element being controlled by a control member, such as a jack;
  loading a cannula into said open clip by means of a cannula-loading unit;
  closing said clip on said cannula;
  moving said clip unit containing said cannula sideways to face a mold unit comprising a first mold portion and a second mold portion that is axially movable relative to said first mold portion between an open position and a closed position in which said first and second mold portions co-operate with each other to define a mold cavity between them, a core being situated in said mold cavity so as to define the shape of said syringe barrel;
  moving said clip unit containing said cannula axially relative to said mold unit, so as to insert said cannula into said mold unit;
  injecting synthetic material into said mold unit so as to mold said syringe barrel around said cannula;
  opening said clip by means of said actuator element of said clip unit, said actuator element being controlled by a control member, such as a jack; and
  opening said mold unit so as to eject said syringe barrel molded around said cannula.

In a first advantageous variant, said step of moving said clip unit containing said cannula axially relative to said mold unit so as to insert said cannula into said mold unit is performed as follows:
  opening said mold unit by moving said second mold portion axially relative to said first mold portion;
  inserting said clip unit into said second mold portion; and
  closing said mold unit by moving said second mold portion, together with said clip unit, axially relative to said first mold portion.

In a second advantageous variant, said step of moving said clip unit containing said cannula axially relative to said mold unit so as to insert said cannula into said mold unit is performed as follows:
  closing said mold unit by moving said second mold portion axially relative to said first mold portion; and
  moving said clip unit containing said cannula axially relative to said closed mold unit so as to insert said cannula into said mold unit.

Advantageously, said step of moving said clip unit containing said cannula sideways is performed by means of a pendular arm, in particular pivotally mounted.

Advantageously, in the closed position of said clip, said cannula may be moved axially relative to said clip.

Advantageously, when said cannula is inserted into said mold unit, the axial end of said cannula that is remote from said perforating tip co-operates with a positioner member of said mold unit, so as to ensure that said cannula is positioned accurately in said mold unit while molding the syringe barrel.

Advantageously, said clip includes a recess that receives the perforating tip of the cannula in all positions, such that no stress is exerted on said perforating tip while loading said cannula into said clip by said cannula-loading unit, while moving said clip, and while molding said syringe barrel around said cannula by said mold unit.

Advantageously, said step of opening said clip so as to load said cannula is performed by a first control member, and said step of opening said clip after molding said syringe barrel is performed by a second control member, said control members being actuated independently of each other, and independently of the movements of said mold unit.

Advantageously, said step of closing said clip is performed automatically, said clip being urged resiliently towards its closed position.

These characteristics and advantages and others of the present invention appear more clearly from the following detailed description, given by way of non-limiting examples, and with reference to the accompanying drawings, and in which.

Figure 1A:
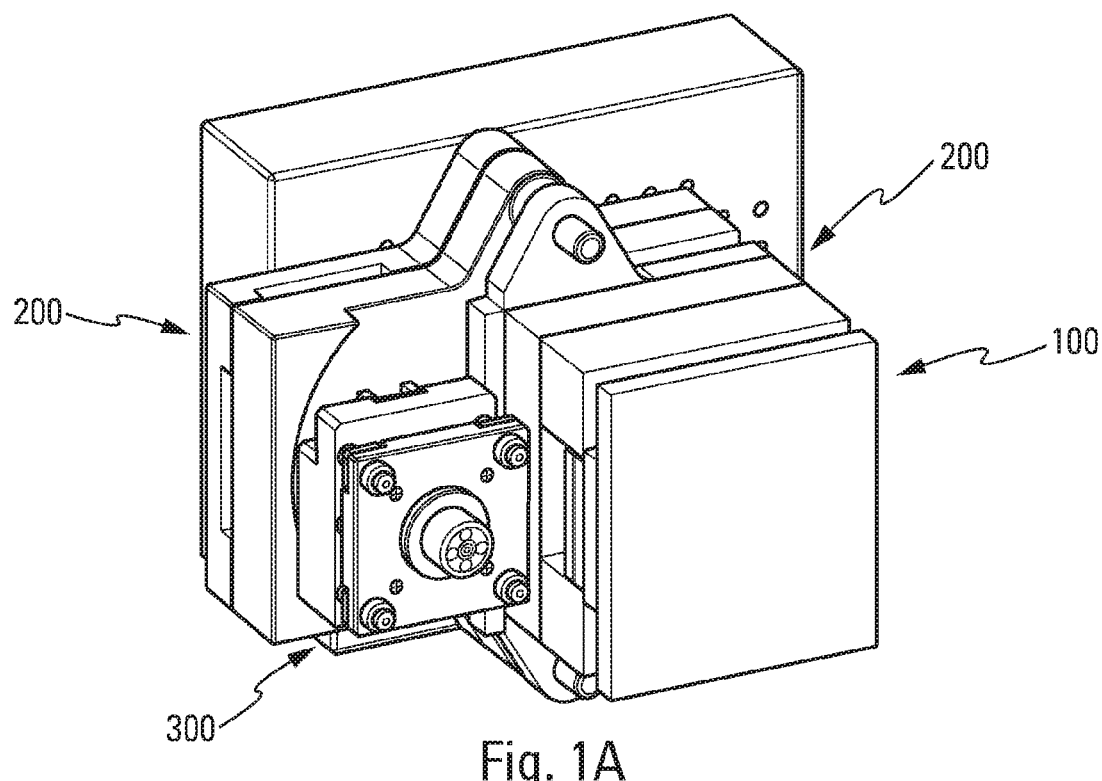
FIGS. 1A and 1B are perspective and cross-section views respectively of a molding assembly in an advantageous embodiment of the invention, in the closed position of said molding assembly.
Figure 1B:
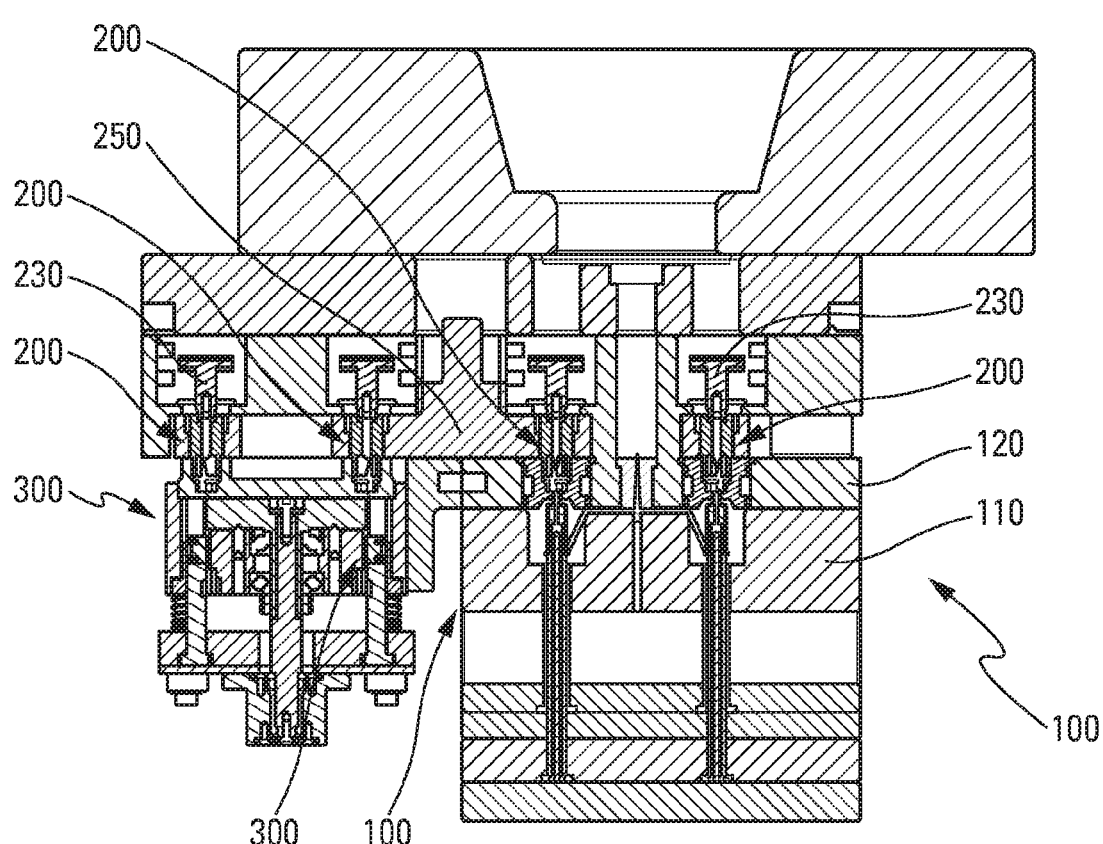

In the description below, the terms "axial", "radial", and "transverse" are relative to the longitudinal axis of the cannula in the mold unit, i.e. the vertical axis in FIGS. 1B and 2 to 10. The terms "proximal" and "distal" are relative to the cannula.

The invention relates more particularly to the manufacture of a syringe barrel 10 provided with a cannula 20, said syringe barrel 10 comprising a cylindrical portion 11 forming a reservoir, and a hub portion 12 to which said cannula 20 is fastened.

The invention is described below with reference to one complete cycle of the molding assembly, with reference to molding one syringe barrel 10 on one cannula 20. Naturally, the molding assembly may comprise a plurality of sub-assemblies that operate simultaneously.

The molding assembly includes at least one mold unit 100, each mold unit 100 comprising a first mold portion 110 and a second mold portion 120 that is axially movable relative to said first mold portion 110 between an open position and a closed position. In this closed position, said first and second mold portions 110, 120 co-operate with each other to define a mold cavity 130 between them, and a core 140 that is situated inside said mold cavity 130 defines the shape of said syringe barrel 10.

The molding assembly also includes at least one clip unit 200 for clipping the cannula 20, each clip unit 200 comprising a clip 210 that is movable between an open position in which a cannula 20 can be loaded into a proximal axial end of said clip 210, and a closed position in which said cannula 20 is held in said clip 210. Said clip unit 200 is axially movable relative to said mold unit 100 so as to place a cannula 20 in said mold cavity 130. The movement of said clip 210 between its open and closed positions is independent of the axial movement of said first and second mold portions 110, 120 between said open and closed positions of said mold unit 100.

Each clip unit 200 includes an actuator element 220 that is axially movable between a closed position and an open position, said actuator element 220 being adapted to move said clip 210 between said closed and open positions.

Advantageously, said actuator element 220 includes a frustoconical proximal axial end 221 that co-operates with a distal axial end 211 of said clip 210. The distal axial end 211 advantageously includes a hollow conical shape that is complementary to said frustoconical proximal axial end 221 of said actuator element 220, such that axial movement of said actuator element 220 causes radial movement of said clip 210 between said closed and open positions. In particular, when the actuator element 220 advances axially in said clip, its frustoconical proximal axial end 221 slides in the complementary hollow conical shape of said distal axial end 211 of said clip 210, and this causes said clip 210 to space apart radially and thus open.

Advantageously, said clip 210 is urged resiliently towards its closed position. Thus, when the actuator element 220 moves axially back out of said clip, said clip closes automatically.

A control member 230, such as a jack, that co-operates with said actuator element 220 of said clip unit 200 is designed to move said actuator element 220 between its closed and open positions. Actuation of the control member 230 is independent of the opening and/or the closing of the mold unit 100.

The molding assembly further includes a cannula-loading unit 300 that is adapted to load a cannula 20 in a clip unit 200. The cannula-loading unit 300 may be of conventional type.

In the embodiment shown in the figures, the molding assembly comprises two mold units 100 and two cannula-loading units 300 that are offset transversally, and four clip units 200 that are arranged in pairs on a pendular arm 250, in particular pivotally mounted. Thus, while the two cannula-loading units 300 load respective cannulas 20 into two clip units, each of the two mold units 100 mold a syringe barrel 10 around a cannula 20. Then, the pendular arm 250 pivots, and firstly brings the two clip units 200 loaded with cannulas 20 to face the two mold units 100, and secondly returns the other two clip units to face the two cannula-loading units 300. Advantageously, four control members 230 are provided to control the four clips 210 separately and independently. However, this advantageous embodiment is not limiting, and other configurations may be envisaged.

Advantageously, the first mold portions 120 of the mold units are formed by a single plate. Advantageously, the second mold portions 120 of the two mold units are also formed by a single plate.

It should be observed that there may be any number of mold units 100, of clip units 200, and of cannula-loading units 300, the above embodiment not being limiting.

Advantageously, each clip 210 includes a recess 215 that receives the perforating tip 21 of the cannula 20 in all positions. Thus, no stress is exerted on said perforating tip 21, neither while loading said cannula 20 into said clip 210 by said cannula-loading unit 300, nor while moving said clip 210, nor while molding said syringe barrel 10 around said cannula 20 by said mold unit 100.

Advantageously, each mold unit 100 includes a positioner member 150 that co-operates with the axial end of the cannula 20 that is remote from said perforating tip 21. This makes it possible to position said cannula 20 accurately in said mold unit 100 while molding the syringe barrel 10, without risk of damaging the perforating tip 21. In this respect, it is advantageous for the clip 210, in its closed position, to allow the cannula 20 to move axially a little relative to the clip, in particular by sliding.

A cycle of manufacturing a syringe barrel is described below with reference to the figures, in order to illustrate the manufacturing method.

Figure 2:
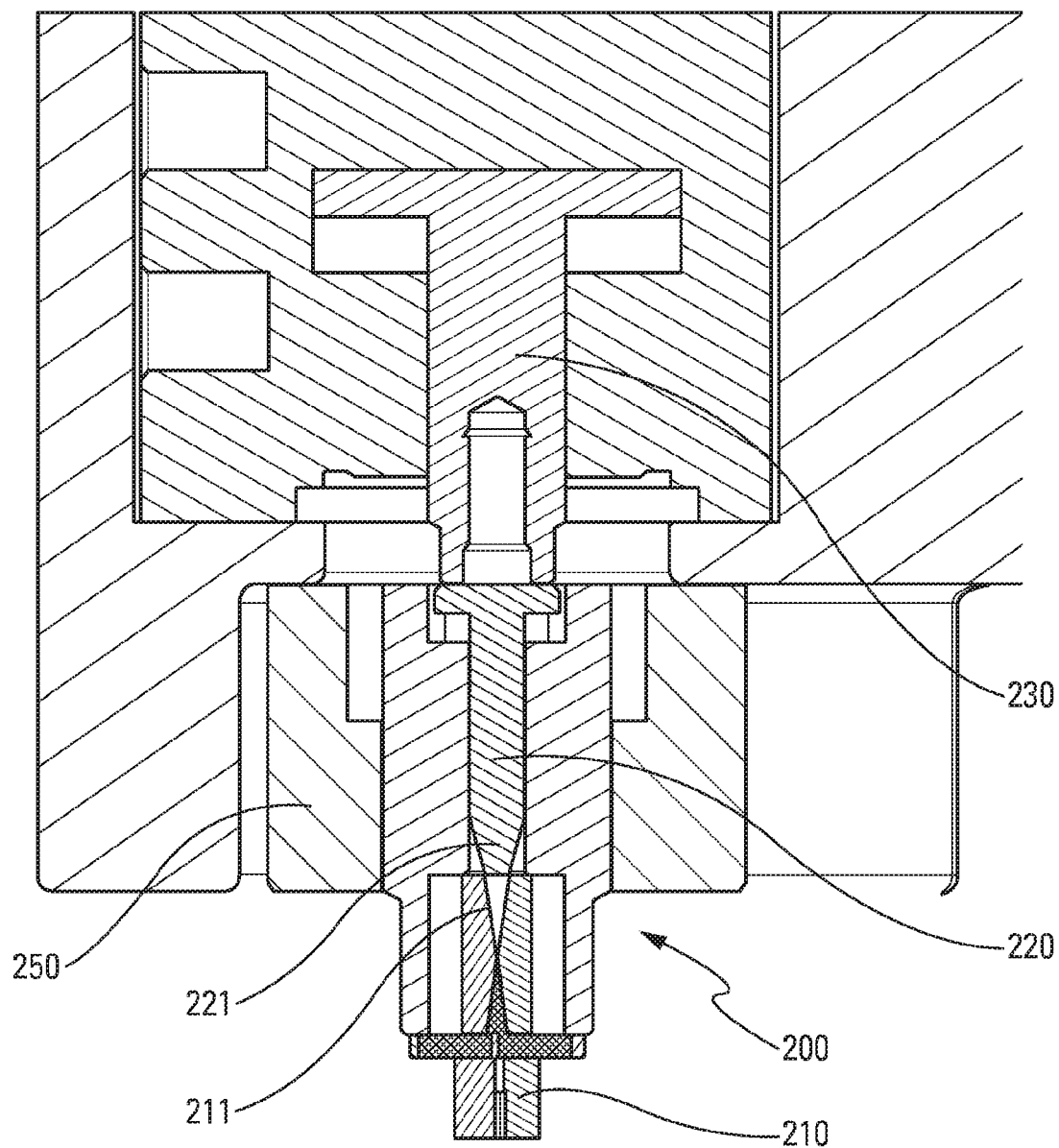
FIG. 2 is a cross-section view of a detail of a clip in its closed position, without a cannula.
Figure 3:
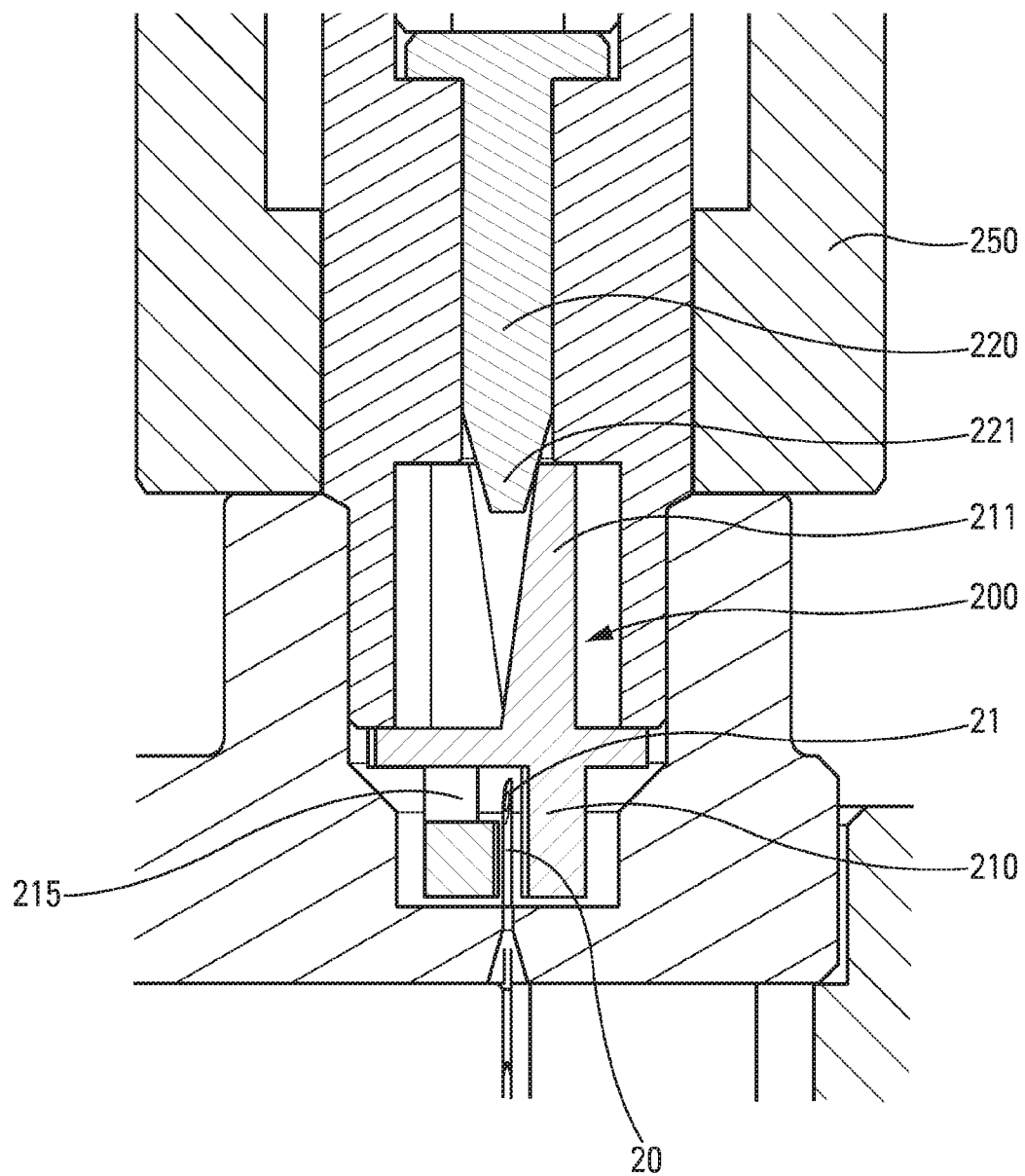
FIG. 3 is a cross-section view of a clip in its open position, without a cannula.

The clip 210, closed in FIG. 2, is opened by means of an actuator element 220 of said clip unit 200, said actuator element 220 being controlled by a control member 230, such as a jack. The open position of the clip can be seen in FIG. 3.

A cannula 20 is then loaded into said open clip 210 by means of a cannula-loading unit 300.

Figure 4:
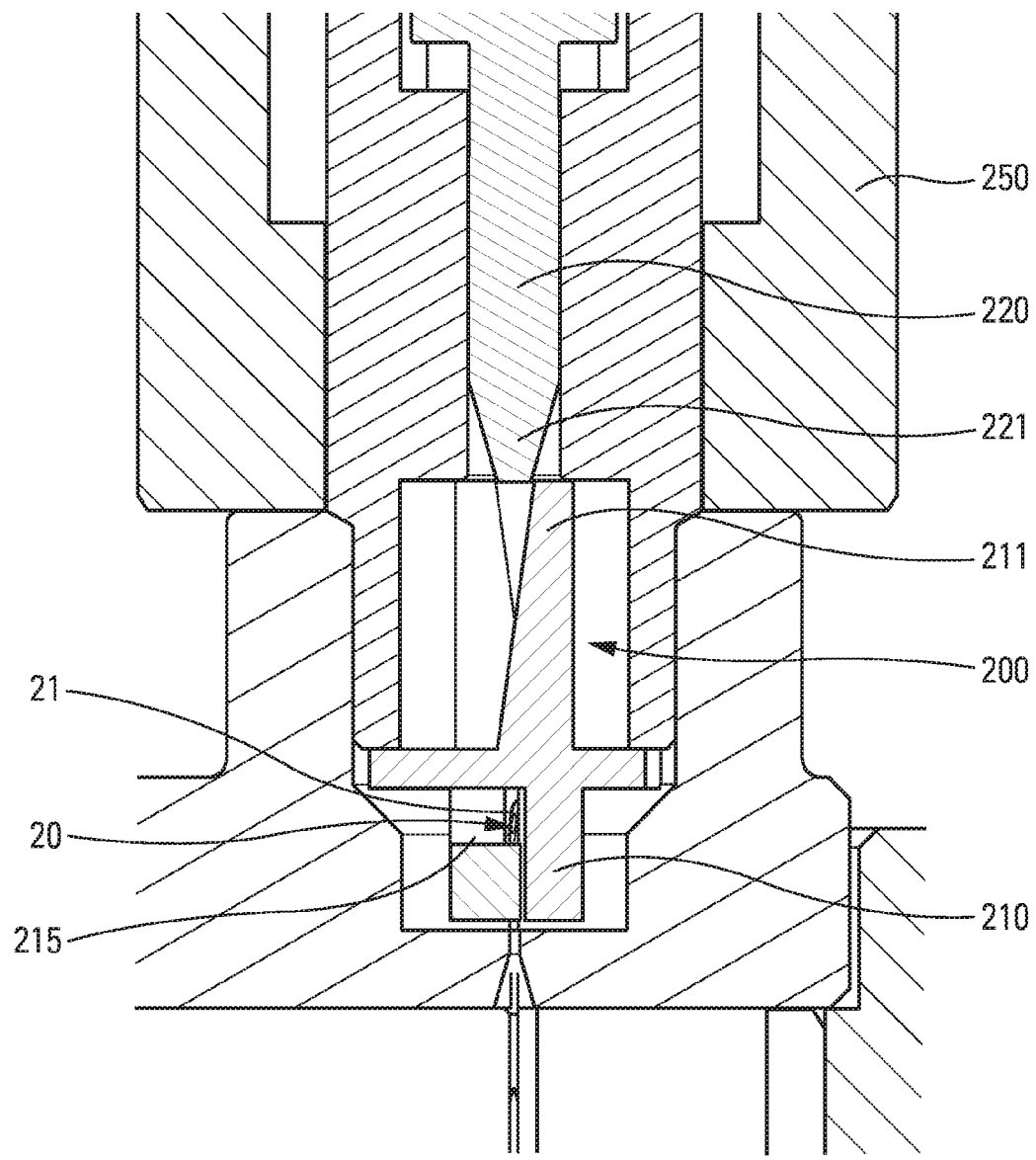
FIG. 4 is a view similar to the view in FIG. 3, with the clip in its closed position.

Said clip 210 is then closed on said cannula 20, as shown in FIG. 4.

Figure 5:
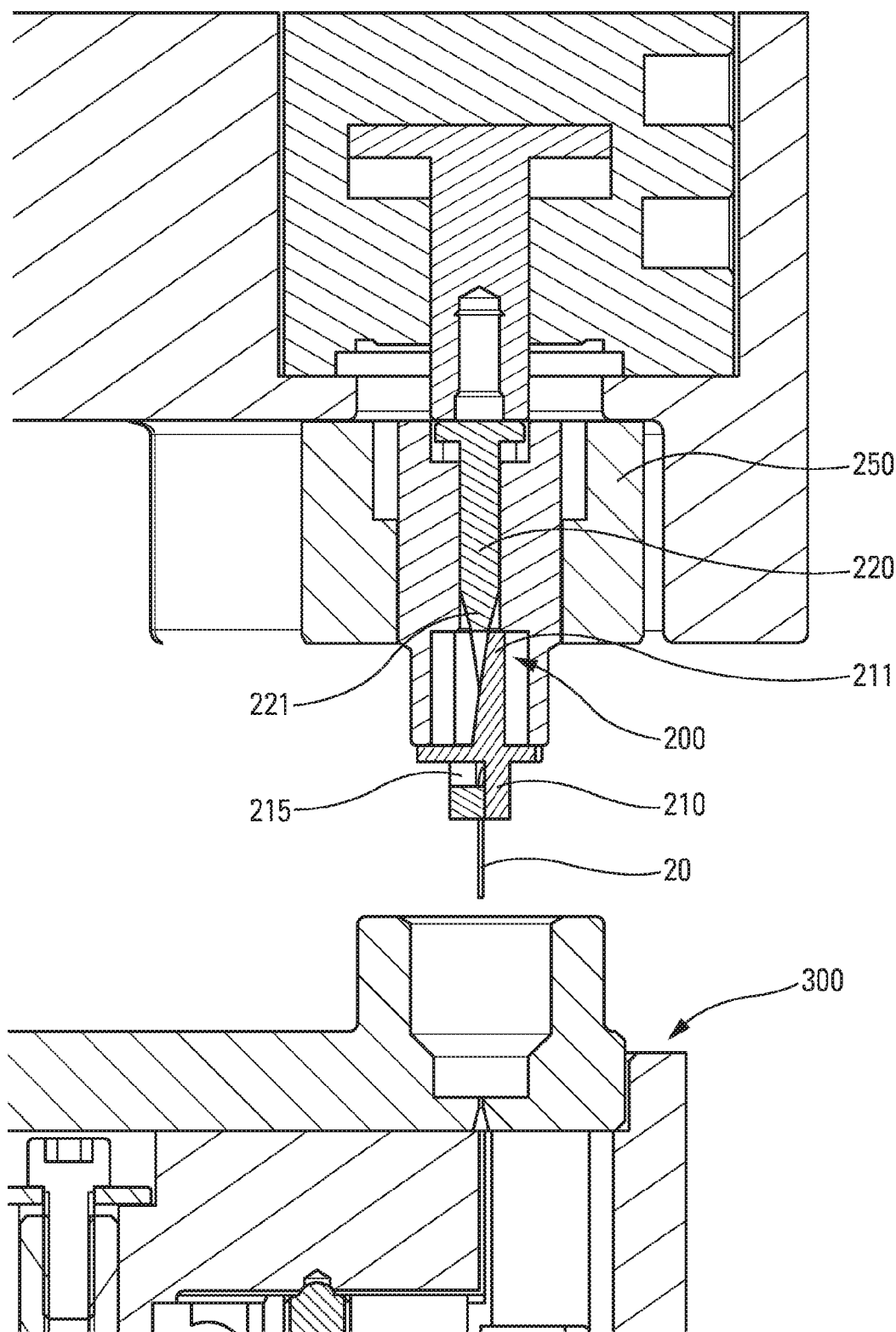
FIG. 5 is a cross-section view of the clip in its closed position containing a cannula, with the clip arranged outside the mold.

Then, as shown in FIG. 5, said clip unit 200 moves axially away from said cannula-loading unit 300, said closed clip 210 containing a cannula 20 being arranged facing a cannula-loading unit 300.

Said clip unit 200 containing said cannula 20 is then moved sideways so as to come to face a mold unit 100.

Figure 7:
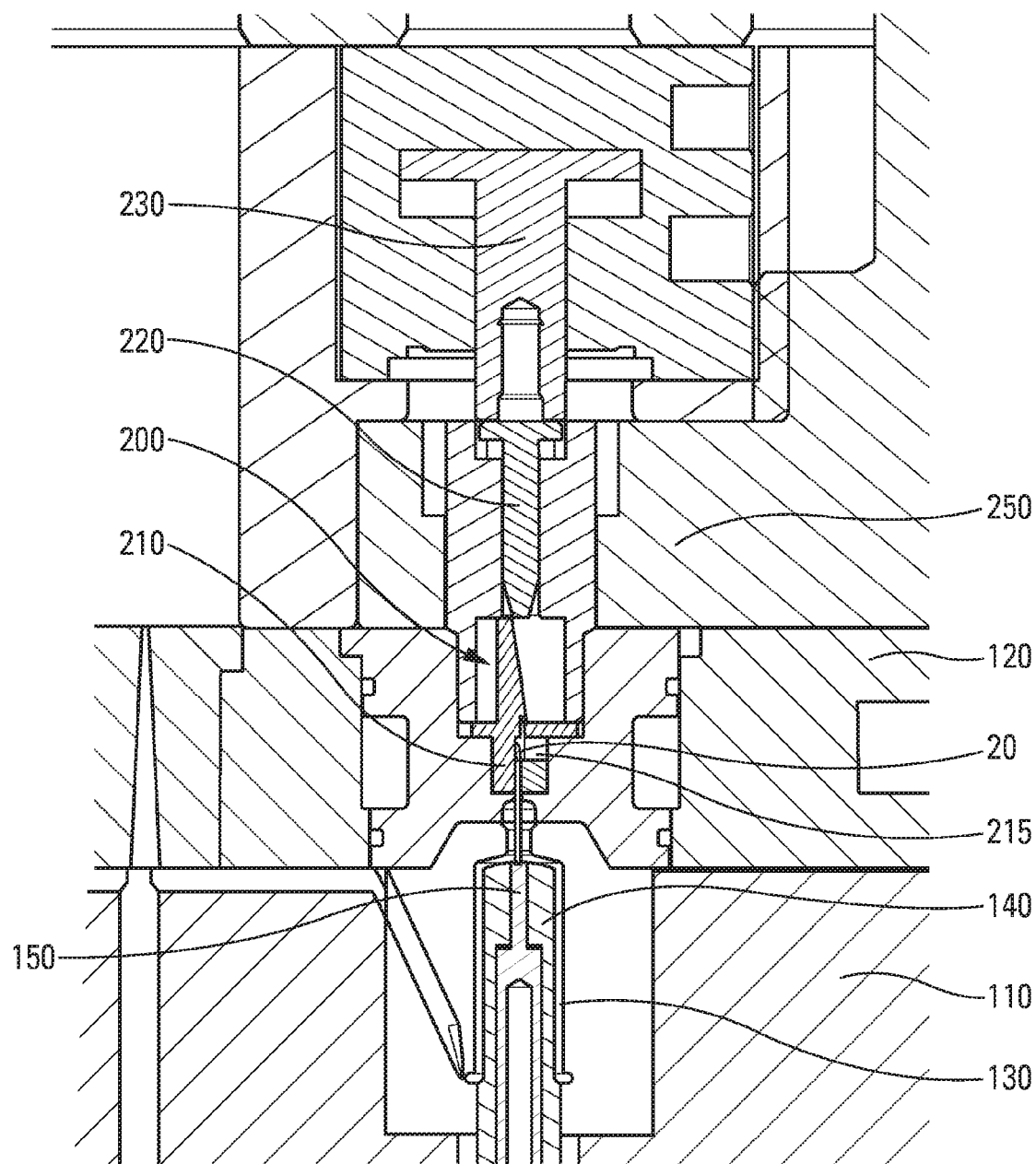
FIG. 7 is a view similar to the view in FIG. 6, with the mold in its closed position.

Then, said clip unit 200 containing said cannula 20 is moved axially relative to said mold unit 100 so as to insert said cannula 20 into said mold unit 100. FIG. 7 shows the position with the closed mold unit 100 containing said cannula.

Figure 8:
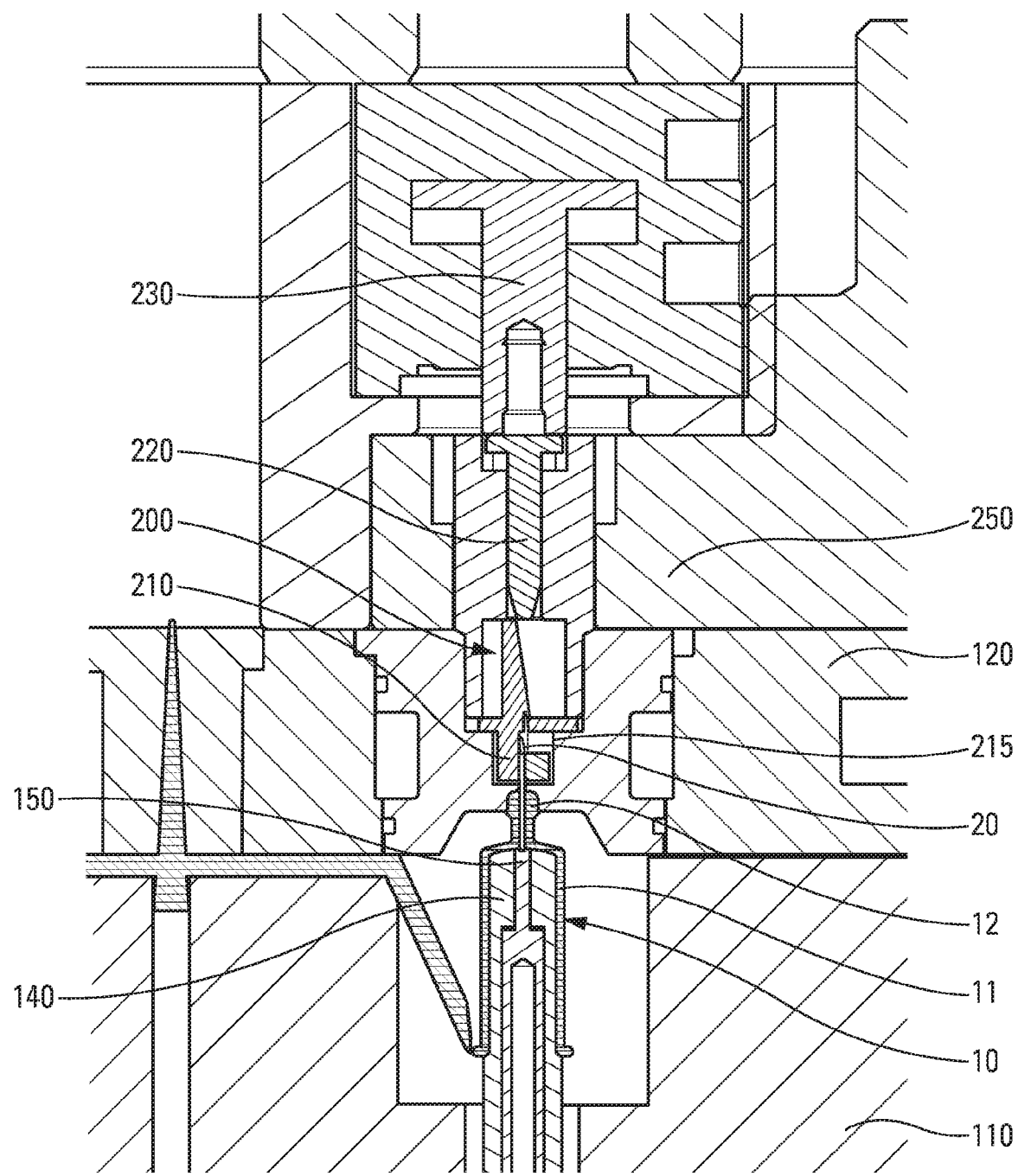
FIG. 8 is a view similar to the view in FIG. 7, while the syringe barrel is being injected.

Synthetic material is then injected into said mold unit 100 so as to mold said syringe barrel 10 around said cannula 20, as can be seen in FIG. 8.

Figure 9:
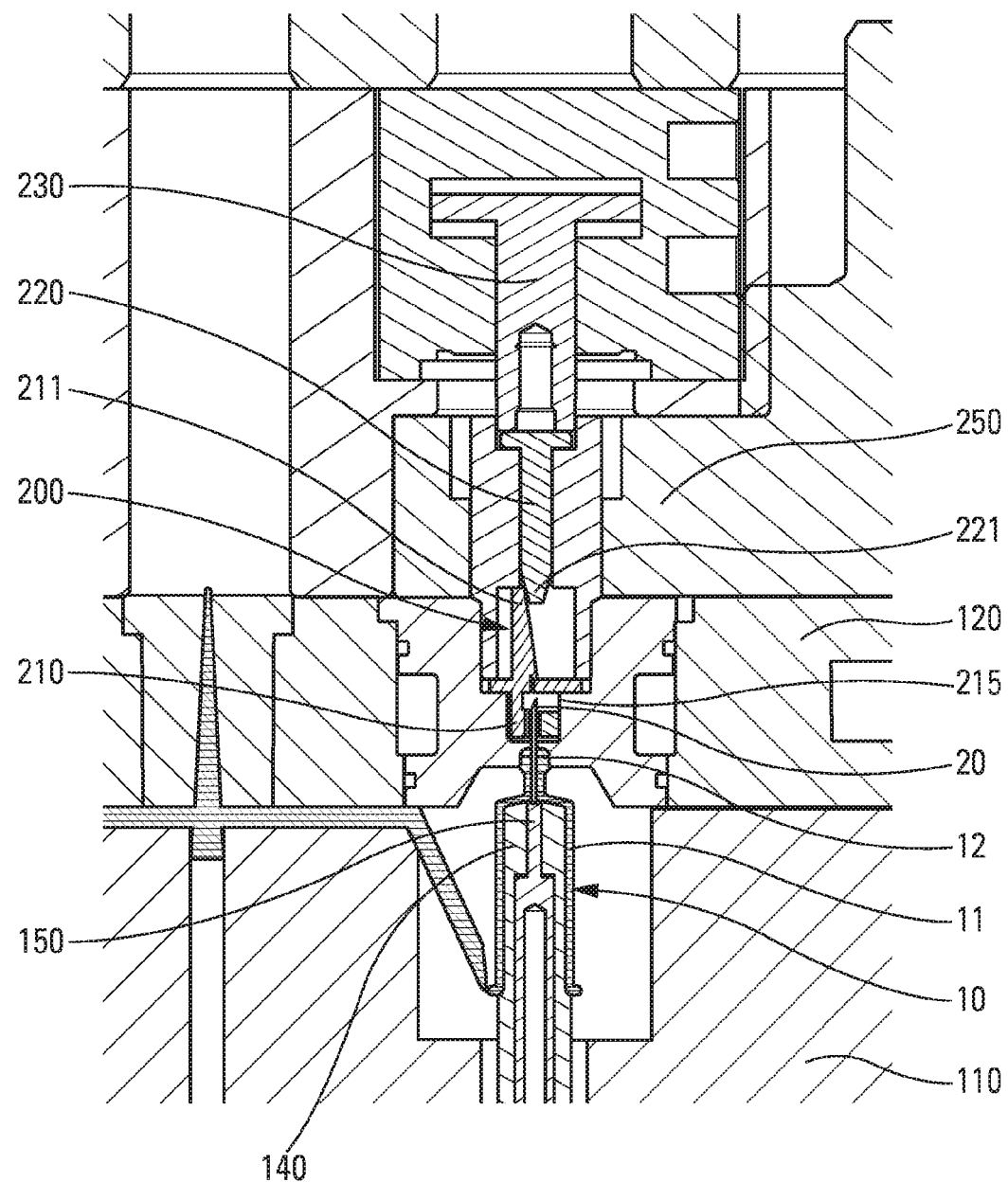
FIG. 9 is a view similar to the view in FIG. 8, after the syringe barrel has been injected onto the cannula, with the clip in its open position.

After molding, said clip 210 is opened by means of said actuator element 220 of said clip unit 200, said actuator element 220 being controlled by a control member 230, such as a jack, as can be seen in FIG. 9. The control member 230 may be different from the control member that was used to open the clip 210 in order to load the cannula. Thus, said step of opening the clip 210 so as to load the cannula 20 may be performed by a first control member 230, and said step of opening said clip 210 after molding said syringe barrel 10 may be performed by a second control member 230, said first and second control members 230 being actuated independently of each other, and independently of the movements of said mold unit 100.

Figure 10:
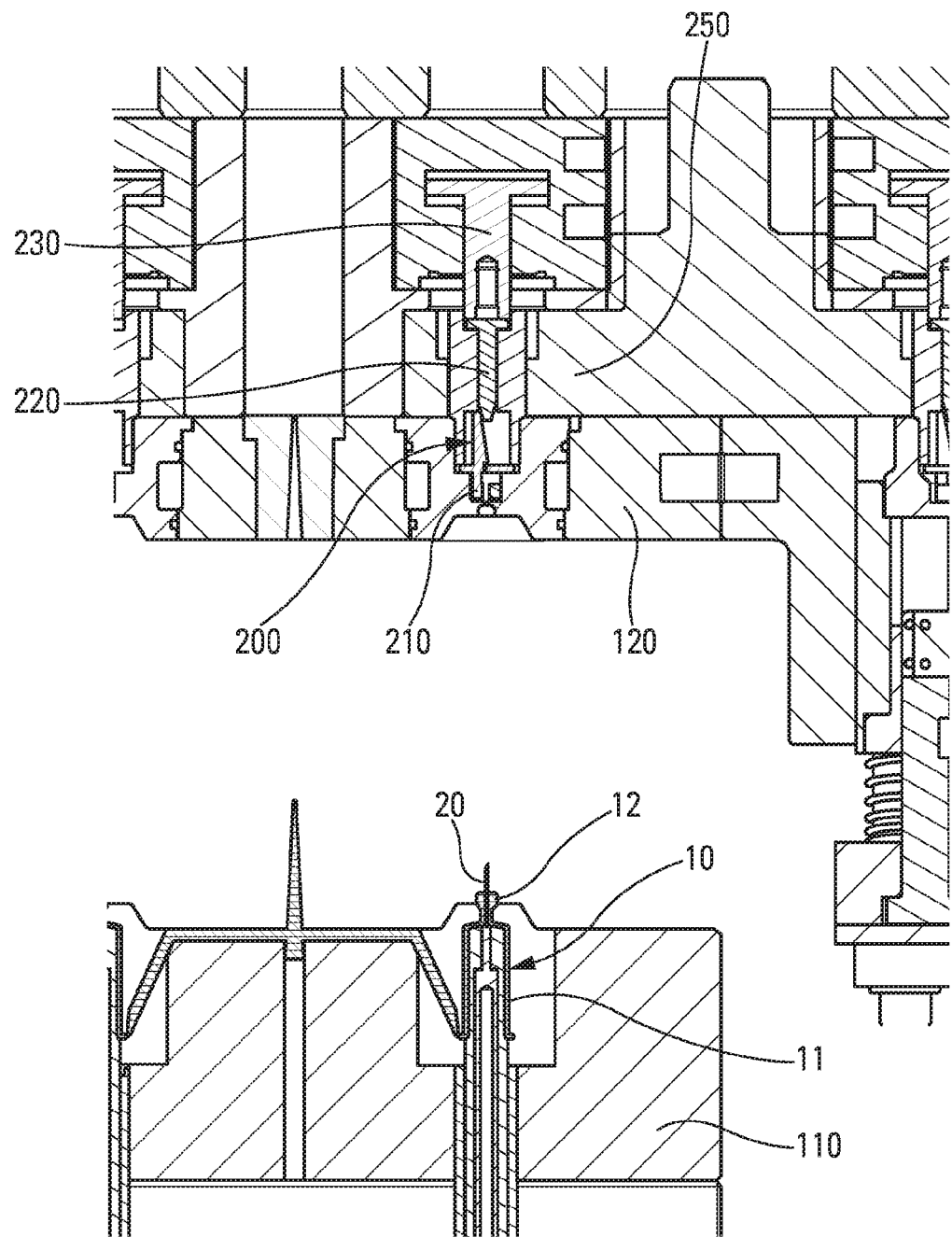
FIG. 10 is a view similar to the view in FIG. 9, with the mold in its open position.

Finally, said mold unit 100 is opened so as to eject said syringe barrel 10 molded around said cannula 20, as shown in FIG. 10.

The molding assembly is then ready for the next cycle.

As explained above, the molding assembly shown in the figures makes it possible to manufacture two syringe bodies simultaneously.

Figure 6:
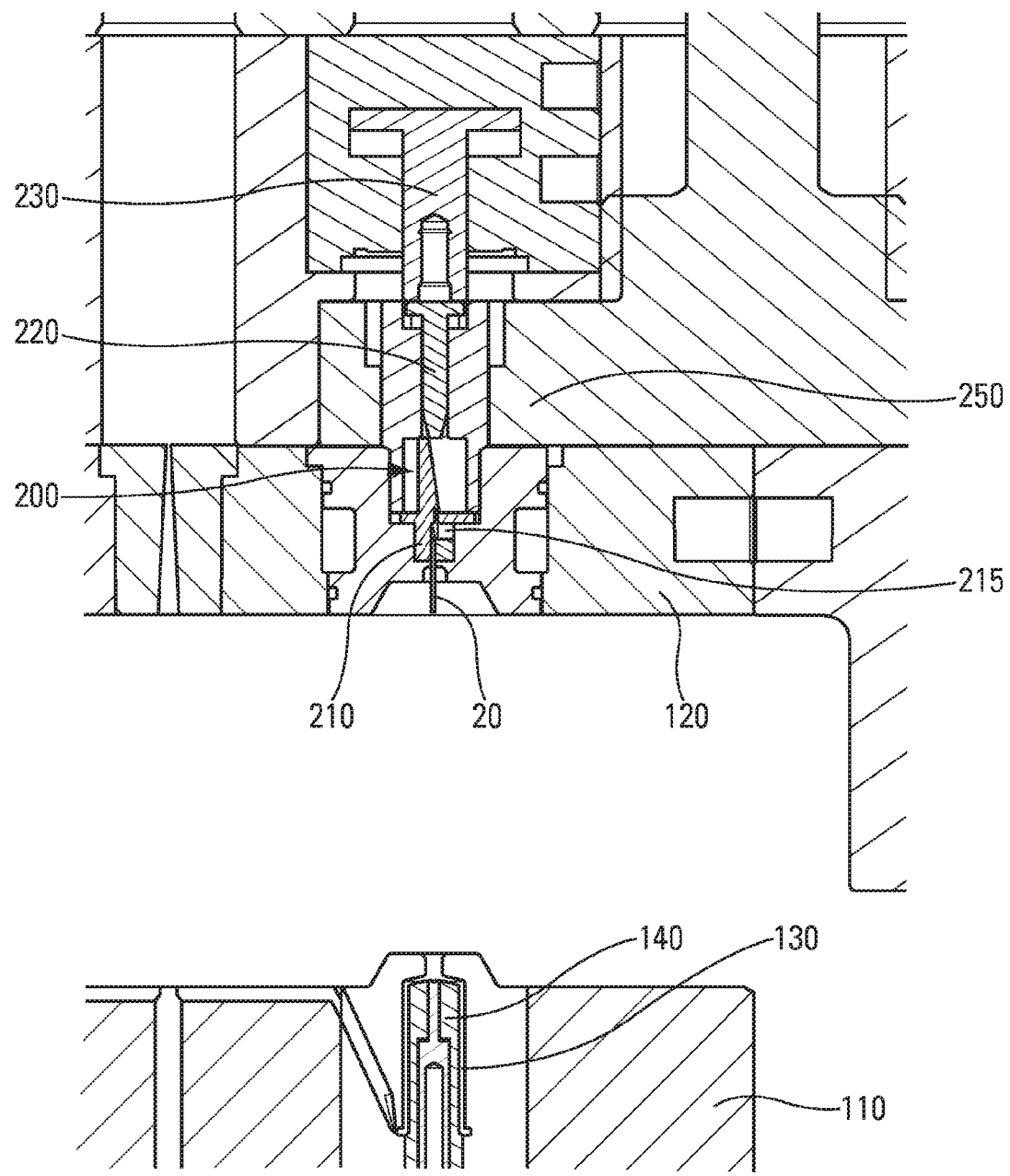
FIG. 6 is a cross-section view of the mold in its open position, with the clip in its closed position, with a cannula.

Advantageously, the step of moving said clip unit 200 containing said cannula 20 axially relative to said mold unit 100 so as to insert said cannula 20 into said mold unit 100 is performed as follows:
said mold unit 100 is initially opened by moving said second mold portion 120 axially relative to said first mold portion 110;
said clip unit 200 is inserted into said second mold portion 120, as can be seen in FIG. 6; and
said mold unit 100 is closed by moving said second mold portion 120, together with said clip unit 200, axially relative to said first mold portion 110.

In a variant, the step of moving said clip unit 200 containing said cannula 20 axially relative to said mold unit 100 so as to insert said cannula 20 into said mold unit 100 may also be performed as follows:
said mold unit 100 is initially closed by moving said second mold portion 120 axially relative to said first mold portion 110; and
said clip unit 200 containing said cannula 20 is moved axially relative to said closed mold unit 100 so as to insert said cannula 20 into said mold unit 100.

Advantageously, said at least one cannula-loading unit 300 is fastened on said second mold portion 120. This makes it possible to correlate the movements of said cannula-loading unit 300 with the movements of said second mold portion 120, and thus improve accuracy in positioning the cannula 20 in the clip 210.

The present invention thus makes it possible, in particular, to provide the following advantages:
no contact takes place with the perforating tip 21 of the cannula 20 during the entire manufacturing method; this makes it possible to avoid any risk of damaging said perforating tip;
the number of times the cannula 20 is transferred is small: the cannula is loaded into the clip and then it remains held in the clip until the end of the method of molding the syringe barrel 10 around the cannula 20; this also makes it possible to limit the risks of damaging the cannula, in particular by limiting contact with dirt or particles; as a result, exposure of the needle to external contaminants is greatly limited; and
the cannula can be positioned very accurately in the mold unit while molding the syringe barrel.

Although the present invention is described above with reference to an advantageous embodiment, naturally various modifications are possible for the person skilled in the art, without going beyond the ambit of the present invention, as defined by the accompanying claims.

The invention claimed is:

1. A method of manufacturing a syringe barrel provided with a cannula, said syringe barrel comprising a cylindrical portion and a hub portion on which said cannula is fastened, the manufacturing method comprises the following steps:
providing a clip unit including a clip that is movable between a closed position and an open position;
opening said clip by means of an actuator element of said clip unit, said actuator element being controlled by a control member;
loading a cannula (20) into said open clip by means of a cannula-loading unit;
closing said clip on said cannula;
moving said clip unit containing said cannula sideways to face a mold unit comprising a first mold portion and a second mold portion that is axially movable relative to said first mold portion between an open position and a closed position in which said first and second mold portions co-operate with each other to define a mold cavity between them, a core being situated in said mold cavity so as to define the shape of said syringe barrel;
moving said clip unit containing said cannula axially relative to said mold unit, so as to insert said cannula into said mold unit;
injecting synthetic material into said mold unit so as to mold said syringe barrel around said cannula;
opening said clip by means of said actuator element of said clip unit, said actuator element being controlled by a control member, such as a jack; and
opening said mold unit so as to eject said syringe barrel molded around said cannula.

2. A method according to claim 1, wherein said step of moving said clip unit containing said cannula axially relative to said mold unit so as to insert said cannula into said mold unit is performed as follows:
opening said mold unit by moving said second mold portion axially relative to said first mold portion;
inserting said clip unit into said second mold portion; and
closing said mold unit by moving said second mold portion, together with said clip unit, axially relative to said first mold portion.

3. A method according to claim 1, wherein said step of moving said clip unit containing said cannula axially relative to said mold unit so as to insert said cannula into said mold unit is performed as follows:
closing said mold unit by moving said second mold portion axially relative to said first mold portion; and
moving said clip unit containing said cannula axially relative to said closed mold unit so as to insert said cannula into said mold unit.

4. A method according to claim 1, wherein said step of moving said clip unit containing said cannula sideways is performed by means of a pendular arm.

5. A method according to claim 1, wherein in the closed position of said clip, said cannula may be moved axially relative to said clip.

6. A method according to claim 5, wherein, when said cannula is inserted into said mold unit, the axial end of said cannula that is remote from said perforating tip co-operates with a positioner member of said mold unit, so as to ensure that said cannula is positioned accurately in said mold unit while molding the syringe barrel.

7. A method according to claim 1, wherein said clip includes a recess that receives the perforating tip of the cannula in all positions, such that no stress is exerted on said perforating tip while loading said cannula into said clip by said cannula-loading unit, while moving said clip, and while molding said syringe barrel around said cannula by said mold unit.

8. A method according to claim 1, wherein said step of opening said clip so as to load said cannula is performed by a first control member, and said step of opening said clip after molding said syringe barrel is performed by a second control member, said control members being actuated independently of each other, and independently of the movements of said mold unit.

9. A method according to claim 1, wherein said step of closing said clip is performed automatically, said clip being urged resiliently towards its closed position.

10. The method according to claim 1, wherein the control member is a jack.

11. The method according to claim 4, wherein the pendular arm is pivotally mounted.

* * * * *